(12) United States Patent
Dahle et al.

(10) Patent No.: US 9,961,303 B2
(45) Date of Patent: *May 1, 2018

(54) VIDEO CONFERENCE VIRTUAL ENDPOINTS

(71) Applicant: Cisco Technology, Inc., San Jose, CA (US)

(72) Inventors: Hakon Dahle, Oslo (NO); Giles Russell Chamberlin, Oxfordshire (GB); Hani Mustafa Elsayed Abdelkader Hashim, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/084,806

(22) Filed: Mar. 30, 2016

(65) Prior Publication Data

US 2016/0212383 A1    Jul. 21, 2016

Related U.S. Application Data

(63) Continuation of application No. 14/795,256, filed on Jul. 9, 2015, now Pat. No. 9,357,172, which is a
(Continued)

(30) Foreign Application Priority Data

Mar. 4, 2013   (NO) .................................. 20130330

(51) Int. Cl.
*H04N 7/15* (2006.01)
*H04L 29/06* (2006.01)
(Continued)

(52) U.S. Cl.
CPC ............... *H04N 7/157* (2013.01); *G06T 3/40* (2013.01); *H04L 65/607* (2013.01);
(Continued)

(58) Field of Classification Search
CPC ..................................................... H04L 65/607
See application file for complete search history.

(56) References Cited

U.S. PATENT DOCUMENTS

| 6,993,076 B1* | 1/2006 | Comer | H04N 5/45 348/407.1 |
| 7,139,015 B2* | 11/2006 | Eshkoli | H04N 7/152 348/14.07 |

(Continued)

FOREIGN PATENT DOCUMENTS

| CN | 101421936 A | 4/2009 |
| CN | 101257607 B | 6/2010 |

(Continued)

OTHER PUBLICATIONS

"Intel® OpenSource HD Graphics Programmer's Reference Manual (PRM) vol. 3 Part 1: Display Registers—VGA Registers (SandyBridge)", Intel Corporation, For the 2011 Intel Core Processor Family, Revision 1.0, May 2011, 58 pages.

(Continued)

*Primary Examiner* — Creighton Smith
(74) *Attorney, Agent, or Firm* — Edell, Shapiro & Finnan, LLC

(57) ABSTRACT

A method and a device providing one virtual endpoint dedicated to serve one particular real endpoint, and the virtual endpoint is typically installed on a server in the same local network as the associated real endpoint, where an MCU or a fraction of a distributed MCCJ also is installed. In the upstream direction, the virtual endpoint includes at least an upstream decoder, a scaling unit and an upstream encoder. In the downstream direction, the virtual endpoint includes at least a number of decoders, a composing unit and a downstream encoder.

22 Claims, 7 Drawing Sheets

Related U.S. Application Data continuation of application No. 14/047,270, filed on Oct. 7, 2013, now Pat. No. 9,113,037.

(60) Provisional application No. 61/772,126, filed on Mar. 4, 2013.

(51) Int. Cl.
  *H04N 7/14* (2006.01)
  *H04N 5/232* (2006.01)
  *G06T 3/40* (2006.01)

(52) U.S. Cl.
  CPC ......... *H04N 5/23245* (2013.01); *H04N 7/142* (2013.01); *H04N 7/15* (2013.01); *H04N 7/152* (2013.01)

(56) References Cited

U.S. PATENT DOCUMENTS

| | | | |
|---|---|---|---|
| 7,461,126 B2 | 12/2008 | Berkeland et al. | |
| 7,692,683 B2* | 4/2010 | Kenoyer | H04N 7/152 348/14.08 |
| 7,929,012 B2 | 4/2011 | Fry et al. | |
| 8,319,820 B2 | 11/2012 | Wiener et al. | |
| 8,392,535 B2 | 3/2013 | Wang et al. | |
| 8,633,962 B2 | 1/2014 | King et al. | |
| 8,831,932 B2* | 9/2014 | Feng | G10L 19/002 704/207 |
| 8,836,753 B2 | 9/2014 | Liang | |
| 8,934,530 B2* | 1/2015 | Horowitz | H04N 19/70 375/240 |
| 2007/0230568 A1 | 10/2007 | Eleftheriadis et al. | |
| 2010/0085419 A1 | 4/2010 | Goyal et al. | |
| 2010/0149301 A1* | 6/2010 | Lee | H04L 12/1818 348/14.08 |
| 2010/0225736 A1 | 9/2010 | King et al. | |
| 2010/0245534 A1 | 9/2010 | De Lind Van Wijngaarden et al. | |
| 2011/0064079 A1* | 3/2011 | Lim | H04L 12/185 370/390 |
| 2011/0307585 A1 | 12/2011 | Wang et al. | |
| 2012/0300018 A1 | 11/2012 | Li et al. | |
| 2014/0376609 A1* | 12/2014 | Barkley | H04N 7/147 375/240.02 |
| 2016/0373697 A1* | 12/2016 | Avni | H04N 7/152 |

FOREIGN PATENT DOCUMENTS

| | | |
|---|---|---|
| WO | 2011143438 A1 | 11/2011 |
| WO | 2013017565 A1 | 2/2013 |

OTHER PUBLICATIONS

"Intel® OpenSource HD Graphics Programmer's Reference Manual (PRM) vol. 3 Part 2: Display Registers—CPU Registers (SandyBridge)", Intel Corporation, For the 2011 Intel Core Processor Family, Revision 1.0, May 2011, pp. 1-106.

"Intel® OpenSource HD Graphics Programmer's Reference Manual (PRM) vol. 3 Part 2: Display Registers—CPU Registers (SandyBridge)", Intel Corporation, For the 2011 Intel Core Processor Family, Revision 1.0, May 2011, pp. 107-215.

"Intel® OpenSource HD Graphics Programmer's Reference Manual (PRM) vol. 3 Part 3: PCH Display Registers (SandyBridge)", Intel Corporation, For the 2011 Intel Core Processor Family, Revision 1.0, May 2011, 122 pages.

"Intel® OpenSource HD Graphics Programmer's Reference Manual (PRM) vol. 4 Part 1: Subsystem and Cores—Shared Functions (SandyBridge)", Intel Corporation, For the 2001 Intel Core Processor Family, Revision 1.0, May 2011, pp. 1-100.

"Intel® OpenSource HD Graphics Programmer's Reference Manual (PRM) vol. 4 Part 1: Subsystem and Cores—Shared Functions (SandyBridge)", Intel Corporation, For the 2001 Intel Core Processor Family, Revision 1.0, May 2011, pp. 101-200.

"Intel® OpenSource HD Graphics Programmer's Reference Manual (PRM) vol. 4 Part 1: Subsystem and Cores—Shared Functions (SandyBridge)", Intel Corporation, For the 2001 Intel Core Processor Family, Revision 1.0, May 2011, pp. 201-282.

"Intel® OpenSource HD Graphics Programmer's Reference Manual (PRM) vol. 4 Part 2: Subsystem and Cores—Message Gateway, URB, and IS (SandyBridge)", Intel Corporation, For the 2011 Intel Core Processor Family, Revision 1.0, May 2011, pp. 1-100.

"Intel® OpenSource HD Graphics Programmer's Reference Manual (PRM) vol. 4 Part 2: Subsystem and Cores—Message Gateway, URB, and IS (SandyBridge)", Intel Corporation, For the 2011 Intel Core Processor Family, Revision 1.0, May 2011, pp. 101-200.

"Intel® OpenSource HD Graphics Programmer's Reference Manual (PRM) vol. 4 Part 2: Subsystem and Cores—Message Gateway, URB, and IS (SandyBridge)", Intel Corporation, For the 2011 Intel Core Processor Family, Revision 1.0, May 2011, pp. 201-278.

Robert Padjen, et al. "Cisco AVVID and IP Telephony, Design & Implementation", www.syngress.com/solutions, 2001, Syngress Publishing, Inc., pp. i-73.

Robert Padjen, et al. "Cisco AVVID and IP Telephony, Design & Implementation", www.syngress.com/solutions, 2001, Syngress Publishing, Inc., pp. 74-173.

Robert Padjen, et al. "Cisco AVVID and IP Telephony, Design & Implementation", www.syngress.com/solutions, 2001, by Syngress Publishing, Inc., pp. 174-273.

Robert Padjen, et al. "Cisco AVVID and IP Telephony, Design & Implementation", www.syngress.com/solutions, 2001, by Syngress Publishing, Inc., pp. 274-373.

Robert Padjen, et al. "Cisco AVVID and IP Telephony, Design & Implementation", www.syngress.com/solutions, 2001, by Syngress Publishing, Inc., pp. 374-501.

"User Guide—TANDBERG Movi version 2.0", www.tandberg.com, D14409.01 User Guide TANDBERG MOVI—Feb. 2009, 17 pages.

"White Paper on Video Wall Display Technology in Videoconferencing", Issue 01, Feb. 23, 2012, Huawei Technologies Co., Ltd., www.huawei.com, 12 pages.

"Implementation of Multi-channel Cascading in Video Conference", Jul. 3, 2012, Huawei Technologies Co., Ltd., www.huawei.com, 6 pages.

"Vidyo Introduces Breakthrough Video Conferencing Technology and Products", www.vidyo.com, https://web.archive.org/web/20080206205917/http:/vidyo.com/news products 012808.hyml, Jan. 28, 2008, 4 pages.

"Vidyo Unveils Virtualized HD Video Conferencing, Offering Unlimited Scalability", Mar. 26, 2012, http://www.vidyo.com/company/news-and-events/press-releases/virtualization/, www.vidyo.com, 4 pages.

"VidyoRouter Cloud Edition", Feb. 23, 2011, Vidyo Extends HD Video Conferencing to Thousands of Endpoints, Reduces Cost up to 90% and Offers Free Firewall Traversal,The Vidyo Blog, www.vidyo.com, http://blog.vidyo.com/tag/vidyorouter-cloud-edition/, 5 pages.

"Vidyo Architecture Offers Unmatched Scalability and Economics for Large Enterprise and Carrier Video Conferencing", "Vidyo Router Cloud Edition" Reduces OpEx by 10X and Includes Free Firewall Traversal, Hackensack, NJ, Feb. 22, 2011, www.vidyo.com, 3 pages.

"VidyoRouter", DS_0509_VR_A4, May 2009, Vidyo, Inc., www.vidyo.com, 2 pages.

Intel®, "Intel 'Visual Life' Survey Fact Sheet", Jan. 2011, Intel Corporation, 3 pages.

"System Overview", Visual Nexus® Version 4.0, GVCS09-02-03-008 issue 2, 2009, Visual Nexus Limited, 2 pages.

"The Wainhouse Research Bulletin—Cisco to Acquire Jabber", The Wainhouse Research Bulletin, vol. 9 #26, Sep. 23, 2008, www.wainhouse.com/bulletin, 7 pages.

(56) References Cited

OTHER PUBLICATIONS

"Fog Lifting on Virtual Clouds", Wainhouse Research News & Reviews on Real-Time Unified Communications, vol. 12 Issue #24, Nov. 15, 2011, 6 pages.
"One-Two Amsterdam Punch: ISE and WR Collaboration Summit New and Wrap-Ups", Wainhouse Research New & Views on Real-Time Unified Communications, vol. 13 Issue #03, Feb. 8, 2012, 8 pages.
"RADVISION Awarded Distributed Multipoint Conferencing Patent", WEBConferencing.org, Web Conferencing Comparison >> RADVISION Awarded Distributed Multipoint Conferencing Patent, http://webconferencing.org/news/radvision-awarded-distributed-multipoint-conferencing-patent/, Feb. 25, 2009, 2 pages.
"Evaluation of the Emblaze-VCON VCBPro Video Bridge", Wainhouse Research, Jun. 2008, 34 pages.
https://www.youtube.com/watch?v=CV7LRsLz_Q4, Unified Conferencing Demo, Nov. 2011.
International-Type Search Report dated Oct. 16, 2013 for National Application Serial No. NO2013/0330, National Filing Date: Mar. 4, 2013 consisting of 4 pages.
Thijs Lambrecht et al., Optimizing multimedia transcoding multicast trees, Elsevier, 2005.
Norwegian Search Report dated Sep. 20, 2013 for Norwegian Application No. 20130330, filed on Mar. 5, 2013 consisting of 2 pages.
Gwennap, "Sandy Bridge Spans Generations—Intel Focuses on Graphics, Multimedia in New Processor Design", The Linley Group, Microprocessor Report—The Insider's Guide to Microprocessor Hardware, Sep. 2010, 8 pages.
"Fact Sheet—2nd Generation Intel® Core Processor Mobile Platform", Intel Corporation, 2010, 8 pages.
"Consumer Backgrounder—Meet the 2nd Generation Intel® Core™ Processor Family Intel® Core™ i7, i5 and i3 Visibly Smart", Intel Corporation, dated 2011, Retrieved from http://newsroom.intel.com/docs/DOC-1658 on Jul. 15, 2015, 2 pages.
"Fact Sheet—2nd Generation Intel® Core™ Processor Desktop Platform", Intel Corporation, Retrieved from http://newsroom.intel.com/docs/DOC-1655 on Jul. 15, 2015, 5 pages.
"Fact Sheet—Fun Facts: 2nd Generation Intel® Core™ Processor Family", Intel Corporation, Retrieved from http://cache-www.intel.com/cd/00/00/46/82/468235_468235.pdf on Jul. 15, 2015, 22 pages.
"Scopia Elite 6000 Series MCU Administrator Guide Version 8.2 for Solution 8.2", Radvision an Avaya Company, Jul. 11, 2013, 93 pages.
"Blue Jeans Network Rolls Out "MCU Killer" in the Cloud", Blue Jeans, Mar. 21, 2012, 2 pages.
"Video Conferencing's Silver Lining", Blue Jeans, Jun. 2012, 22 pages.
"CeBIT 2008: VidSoft shows first time PC-Videoconferencing in HD-Quality", So-Co-IT-Software, Communication and IT-Newsticker, Feb. 18, 2008, 4 pages.
"Citrix Unveils GoToMeeting with HDFaces™: Integrated HD Video Conferencing", Learning Technologies, Training Industry, Oct. 6, 2010, 4 pages.
"News Fact Sheet—2nd Generation Intel® Core™ Processors Offer New Level of Visual Power, Speed, Performance for Embedded Applications", Intel Corporation, dated Jan. 5, 2011, Retrieved from http://download.intel.com/pressroom/kits/embedded/pdfs/ECG_2nd_Gen_Intel_Core_FactSheet.pdf on Jul. 15, 2015, 3 pages.
"HD Video Reference Design", Vocal Technologies, Retrieved from http://www.vocal.com/system-designs/hd-video/ on Jun. 26, 2015, 5 pages.
"The Vidyo Infrastructure", VIDYO, Vidyo Products, Retrieved from http://www.vidyo.com/products/deploy/#ab=Interoperability on Mar. 3, 2015, 6 pages.
"Huawei VP9650 MCU", HUAWEI Technologies Co., 2013, Retrieved from http://enterprise.huawei.com/ilink/enenterprise/download/HW_267580 on Jul. 16, 2015, 2 pages.
"Implementation of Multi-channel-Cascading in Video Conference", HUAWEI Technologies Co., Jul. 3, 2012, 6 pages.
Smith, "IDF 2009 Intel Developer Forum—Intel Roadmap Overview", Intel Corporation, Sep. 22, 2009, 32 pages.
"Intel Brings 'Eye Candy' to Masses with Newest Laptop, PC Chips", Intel Corporation, Intel Newsroom, Retrieved from http://newsroom.intel.com/community/intel_newsroom/blog/2011/01/05/intel-brings-eye-candy-to-masses-with-newest-laptop-pc-chips, Jan. 5, 2011, 3 pages.
"Intel Details 2011 Processor Features, Offers Stunning Visuals Built-in", Intel Corporation, Intel Newsroom, Retrieved from http://newsroom.intel.com/community/intel_newsroom/blog/2010/09/13/intel-details-2011-processor-features-offers-stunning-visuals-built-in, Sep. 13, 2010, 2 pages.
"News Fact Sheet—Intel Details 2011 Processor Features, Offers Stunning Visuals Built-in", Intel Corporation, Intel Developer Forum, San Francisco, Sep. 13, 2010, 3 pages.
"All New 2nd Gen Intel® Core™ Mobile Processor (SV) Lineup", Intel Corporation, Jan. 4, 2011, 6 pages.
"Fact Sheet—Intel® Insider™:Opening Up a Whole New World of Premium Content", Intel Corporation, Retrieved from http://newsroom.intel.com/docs/DOC-1656 on Jul. 16, 2015, 3 pages.
"Series H: Audiovisual and Multimedia Systems Infrastructure of audiovisual services—Communication procedures", International Telecommunication Union, Telecommunication Standardization Sector of ITU, H.243, Feb. 2000, 62 pages.
"Line Transmission of Non-Telephone Signals", International Telecommunication Union, Telecommunication Standardization Sector of ITU, H.243, Mar. 1993, 30 pages.
"Virtualized. Integrated. Video infrastructure for ultimate control and flexibility", Life Size, LifeSize UVC Platform, Jul. 2012, Retrieved from http://www.go-dove.com/media/651004_23_A1_Product-Information.PDF on Jul. 16, 2015, 2 pages.
"MCU1.com to Put Video Conferencing Users in Control and Drive Mass Adoption of HD Video Conferencing", MCU1.com, Oslo, Norway, Oct. 30, 2012, 1 page.
"MCU-323 Multipoint Conferencing Unit—User Guide", RADVISION, Jul. 2000, Part 1—pp. 1-95.
"MCU-323 Multipoint Conferencing Unit—User Guide", RADVISION, Jul. 2000, Part 2—pp. 96-185.
"Movi", TANDBERG, Feb. 2009, 2 pages.
"Movi version 4.0—Administrator guide, Software version 4.0.1.8289", TANDBERG, Oct. 2010, 23 pages.
"Avistar Announces Revolutionary Multiparty Videoconferencing Performance Breakthrough", Avistar, Retrieved from http://www.avistar.com/pressreleasesavistarannouncesrevolutionarymultiparty-videoconferencingperformancebreakthrough/, Nov. 29, 2011, 1 page.
Karapetkov, "Scalable Infrastructure for Distributed Video", POLYCOM, Nov. 2009, 13 pages.
"Polycom DMA 7000 System Operations Guide", POLYCOM, Jul. 2011, pp. i-77.
"Polycom DMA 7000 System Operations Guide", POLYCOM, Jul. 2011, pp. 78-169.
"Polycom DMA 7000 System Operations Guide", POLYCOM, Jul. 2011, pp. 170-254.
"Polycom DMA 7000 System Operations Guide", POLYCOM, Jul. 2011, pp. 255-334.
"MCU-323 Multipoint Conferencing Unit—User Guide", P/N 61288-00001 Rev C, Radvision, Jul. 2000, pp. i through 6-3. pages.
"MCU-323 Multipoint Conferencing Unit—User Guide", P/N 61288-00001 Rev C, Radvision, Jul. 2000, pp. 6-4 through Index-5.
"Intel® OpenSource HD Graphics Programmer's Reference Manual (PRM) vol. 1 Part 1: Graphics Core (SandyBridge)", Intel Corporation, For the 2011 Intel Core Processor Family, Revision 1.0, May 2011, 130 pages.
"Intel® OpenSource HD Graphics Programmer's Reference Manual (PRM) vol. 1 Part 2: Graphics Core—MMIO, Media Registers, and Programming Environment (SandyBridge)", Intel Corporation, For the 2011 Intel Core Processor Family, Revision 1.0, May 2011, 68 pages.

(56) References Cited

OTHER PUBLICATIONS

"Intel® OpenSource HD Graphics Programmer's Reference Manual (PRM) vol. 1 Part 3: Graphics Core—Memory Interface and Commands for the Render Engine (SandyBridge)", Intel Corporation, For the 2011 Intel Core Processor Family, Revision 1.0, May 2011, 132 pages.

"Intel® OpenSource HD Graphics Programmer's Reference Manual (PRM) vol. 1 Part 4: Graphics Core—Video Codec Engine (SandyBridge)", Intel Corporation, For the 2011 Intel Core Processor Family, Revision 1.0, May 2011, 59 pages.

"Intel® OpenSource HD Graphics Programmer's Reference Manual (PRM) vol. 1 Part 5: Graphics Core—Blitter Engine (SandyBridge)", Intel Corporation, For the 2011 Intel Core Processor Family, Revision 1.0, May 2011, 138 pages.

"Intel® OpenSource HD Graphics Programmer's Reference Manual (PRM) vol. 2 Part 1: 3D/Media—3D Pipeline (SandyBridge)", Intel Corporation, For the 2011 Intel Core Processor Family, Revision 1.0, May 2011, pp. 1-100.

"Intel® OpenSource HD Graphics Programmer's Reference Manual (PRM) vol. 2 Part 1: 3D/Media—3D Pipeline (SandyBridge)", Intel Corporation, For the 2011 Intel Core Processor Family, Revision 1.0, May 2011, pp. 301-386.

"Intel® OpenSource HD Graphics Programmer's Reference Manual (PRM) vol. 2 Part 1: 3D/Media—3D Pipeline (SandyBridge)", Intel Corporation, For the 2011 Intel Core Processor Family, Revision 1.0, May 2011, pp. 101-200.

"Intel® OpenSource HD Graphics Programmer's Reference Manual (PRM) vol. 2 Part 1: 3D/Media—3D Pipeline (SandyBridge)", Intel Corporation, For the 2011 Intel Core Processor Family, Revision 1.0, May 2011, pp. 201-300.

"Intel® OpenSource HD Graphics Programmer's Reference Manual (PRM) vol. 2 Part 2: 3D/Media—Media (SandyBridge)", Intel Corporation, For the 2011 Intel Core Processor Family, Revision 1.0, May 2011, 92 pages.

First Office Action in corresponding Chinese Application No. 201480012476.5, dated Sep. 1, 2017, 4 pages.

\* cited by examiner

VIDEO CONFERENCE VIRTUAL ENDPOINTS

CROSS-REFERENCE TO RELATED APPLICATION

This application is a continuation of U.S. Non-Provisional patent application Ser. No. 14/795,256, filed Jul. 9, 2015, entitled VIDEO CONFERENCE VIRTUAL ENDPOINTS, which is a continuation of U.S. Non-Provisional patent application Ser. No. 14/047,270, filed Oct. 7, 2013, entitled VIDEO CONFERENCE VIRTUAL ENDPOINTS, now U.S. Pat. No. 9,113,037, which in turn is related to and claims priority to U.S. Provisional Patent Application Ser. No. 61/772,126, filed Mar. 4, 2013, entitled VIRTUAL ENDPOINT and to Norwegian Patent Application No. 20130330 filed Mar. 4, 2013, entitled VIDEO CONFERENCE VIRTUAL ENDPOINTS. The entirety of each of these applications are incorporated herein by reference.

STATEMENT REGARDING FEDERALLY SPONSORED RESEARCH OR DEVELOPMENT n/a

FIELD OF THE INVENTION

The present invention relates to a method, computer program and a system providing efficient large scale video conference.

BACKGROUND OF THE INVENTION

Transmission of moving pictures in real-time is employed in several applications like e.g. video conferencing, net meetings and video telephony.

Video conferencing systems allow for simultaneous exchange of audio, video and data information among multiple conferencing sites. Systems known as Multipoint Control Units (MCUs) perform switching functions to allow the endpoints of multiple sites to intercommunicate in a conference. An endpoint conventionally refers to a video conference terminal, either a stand-alone terminal equipped with at least a camera, a display, a loudspeaker or a headphone and a processor or a video conferencing software client installed on a general purpose computer with the corresponding capabilities. In the following specification, this will also be referred to as a "real endpoint" to distinguish it from "virtual endpoint", whose definition will be disclosed later in the specification.

The MCU links the sites together by receiving frames of conference signals from the sites, processing the received signals, and retransmitting the processed signals to—appropriate sites. The conference signals include audio, video, data and control information. In a switched conference, the video signal from one of the endpoints, typically that of the loudest speaker, is broadcasted to each of the participants. In a continuous presence conference, video signals from two or more sites are spatially mixed to form a composite video signal for viewing by conference participants. When the different video streams have been mixed together into one single video stream, the composed video stream is transmitted to the different parties of the video conference, where each transmitted video stream preferably follows a set of schemes indicating who will receive which video stream. In general, the different users prefer to receive different video streams. The continuous presence or composite image is a combined picture that may include live video streams, still images, menus or other visual images from participants in the conference. The combined picture may e.g. be composed by several equally sized pictures, or one main picture in addition to one or more smaller pictures in inset windows, commonly referred to as Picture-in-Picture (PIP). PIPs require typically a much lower resolution than the main picture due to the size difference within the screen.

A key problem with existing MCUs using the H.323 and SIP standards is the lack of scalability. In order to host large meetings one of three solutions may be used:

All endpoints call into a single large MCU in a single location. The problem of this is the excessive bandwidth consumption. As an example, if a video conference includes a large number of endpoints in both USA and Europe with the MCU residing in New York, a huge bandwidth usage across the Atlantic between the MCU and the endpoints in Europe would be required.

Another possibility is to cascade several MCUs by using H.243 or similar. The problem with this is that a broken user experience may occur. When all endpoints call into the same MCU, a participant typically views the 4-to-10 most recent speakers simultaneously. When endpoints call into two different MCUs, an endpoint can only see one of the endpoints connected to the other MCU.

There already exists non-standards based MCU dealing with problems discussed above using techniques such as SVC (Scalable Video Coding), but the investment in standards based endpoints would then be lost, and a problem with interoperability would also occur.

SUMMARY OF THE INVENTION

An object of embodiments herein is to overcome or at least alleviate the above mentioned disadvantage. This object and other objects are achieved by the independent claims enclosed herewith.

According to a first aspect, there is provided a virtual endpoint adapted to be installed on a computer device associated with a video conference endpoint adapted to participate in a multi-party video conference. The video conference endpoint is adapted to encode and transmit an upstream media stream comprising at least video data in an upstream direction and to receive and decode a combined media stream in a downstream direction. The virtual endpoint is characterized in comprising at least one upstream decoder adapted to decode an upstream encoded media stream received from the video conference endpoint into an upstream decoded media stream, a scaling device adapted to scale the upstream decoded media stream into a scaled upstream media stream, and at least one upstream encoder adapted to encode the scaled upstream media stream into an encoded scaled upstream media stream. The virtual endpoint is furthermore characterized in comprising a first downstream decoder adapted to decode a downstream encoded media stream of a first resolution, at least one second downstream decoder adapted to decode at least one of a number of downstream encoded media streams of a second resolution, a media composer adapted to compose a combined downstream media stream of decoded media streams of the first and the second resolution, and at least one downstream encoder adapted to encode the combined downstream media stream.

According to an embodiment, the virtual endpoint is characterized in that it is further adapted to retransmit the received upstream encoded media stream.

According to another embodiment, the virtual endpoint is characterized in that the first resolution is a High Definition (HD) resolution.

According to yet another embodiment, the virtual endpoint is characterized in that the scaling device is adapted to scale video data in the decoded media stream to the second resolution.

According to one embodiment, the virtual endpoint is characterized in that the second resolution is a Picture-in-Picture (PIP) resolution.

According to another embodiment, the virtual endpoint is characterized in that one or more other virtual endpoints respectively associated with one or more other endpoints adapted to participate in the multi-party video conference are adapted to be installed on the computer device.

According to yet another embodiment, the virtual endpoint is characterized in the virtual endpoint being connected to a switching node adapted to switch the encoded scaled upstream media stream and/or the upstream encoded media stream in the upstream direction to other switching nodes involved in the multi-party video conference.

According to a further embodiment, the virtual endpoint is characterized in that the switching node is further adapted to switch the downstream encoded media stream of the first resolution and the number of downstream encoded media streams of the second resolution to one or more virtual endpoints associated with the other switching nodes.

According to a second aspect, there is provided a method in a virtual endpoint installed on a computer device associated with a video conference endpoint participating in a multi-party video conference. The video conference endpoint is encoding and transmitting an upstream media stream comprising at least video data in an upstream direction and receiving and decoding a combined downstream media stream in a downstream direction. The method is characterized in comprising the steps of decoding an upstream encoded media stream received from the video conference endpoint into an upstream decoded media stream, scaling the upstream decoded media stream into a scaled upstream media stream, encoding the scaled upstream media stream into an encoded scaled upstream media stream. The method is furthermore characterized in comprising the steps of decoding a downstream encoded media stream of a first resolution, decoding a number of downstream encoded media streams of a second resolution, composing a combined media stream of the downstream media stream of the first resolution and the number of downstream media streams of the second resolution, and encoding the combined media stream.

According to an embodiment, the method is characterized in comprising an additional step of retransmitting the received upstream encoded media stream.

According to another embodiment, the method is characterized in that the first resolution is a High Definition (HD) resolution.

According to yet another embodiment, the method is characterized in an additional step of scaling video data in the decoded media stream to the second resolution.

According to a further embodiment, the method is characterized in that the second resolution is a Picture-in-Picture (PIP) resolution.

According to one embodiment, the method is characterized in that one or more other virtual endpoints respectively associated with one or more other endpoints participating in the multi-party video conference are installed on the computer device.

According to another embodiment, the method is characterized in an additional step of switching the encoded scaled upstream media stream and/or the upstream encoded media stream in the upstream direction to other switching nodes involved in the multi-party video conference.

According to a further embodiment, the method is characterized in an additional step of switching the downstream encoded media stream of the first resolution and the number of downstream encoded media streams of the second resolution to one or more virtual endpoints associated with the other switching nodes.

According to a third aspect, there is provided an endpoint system comprising at least one virtual endpoint as discussed in the foregoing. The virtual endpoint system further comprises at least one switching node adapted to switch the encoded scaled upstream media stream and/or the upstream encoded media stream in the upstream direction to other switching nodes involved in the multi-party video conference.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

According to embodiments herein, a virtual endpoint is introduced overcoming the above discussed problems. One virtual endpoint is dedicated to serve one particular real endpoint, and the virtual endpoint is typically installed on a server in the same local network as the associated real endpoint, where a Multipoint Control Unit (MCU) or a fraction of a distributed MCU also is installed.

In the upstream direction, the virtual endpoint includes at least an upstream decoder, a scaling unit and an upstream encoder. In the downstream direction, the virtual endpoint includes at least a number of decoders, a composing unit and a downstream encoder.

The real endpoint transmits coded data to its dedicated virtual endpoint which is being decoded by the upstream decoder. The decoded data is being available for the scaling unit, which in turn is being downscaled to a predefined or requested resolution. The downscaled data is then encoded by the upstream encoder, and transmitted further as a downscaled stream, e.g. to one or more stream switching nodes. In addition, the received coded data from the real endpoint is forwarded through the virtual endpoint as a non-downscaled stream to the one or more media nodes.

Figure 1:
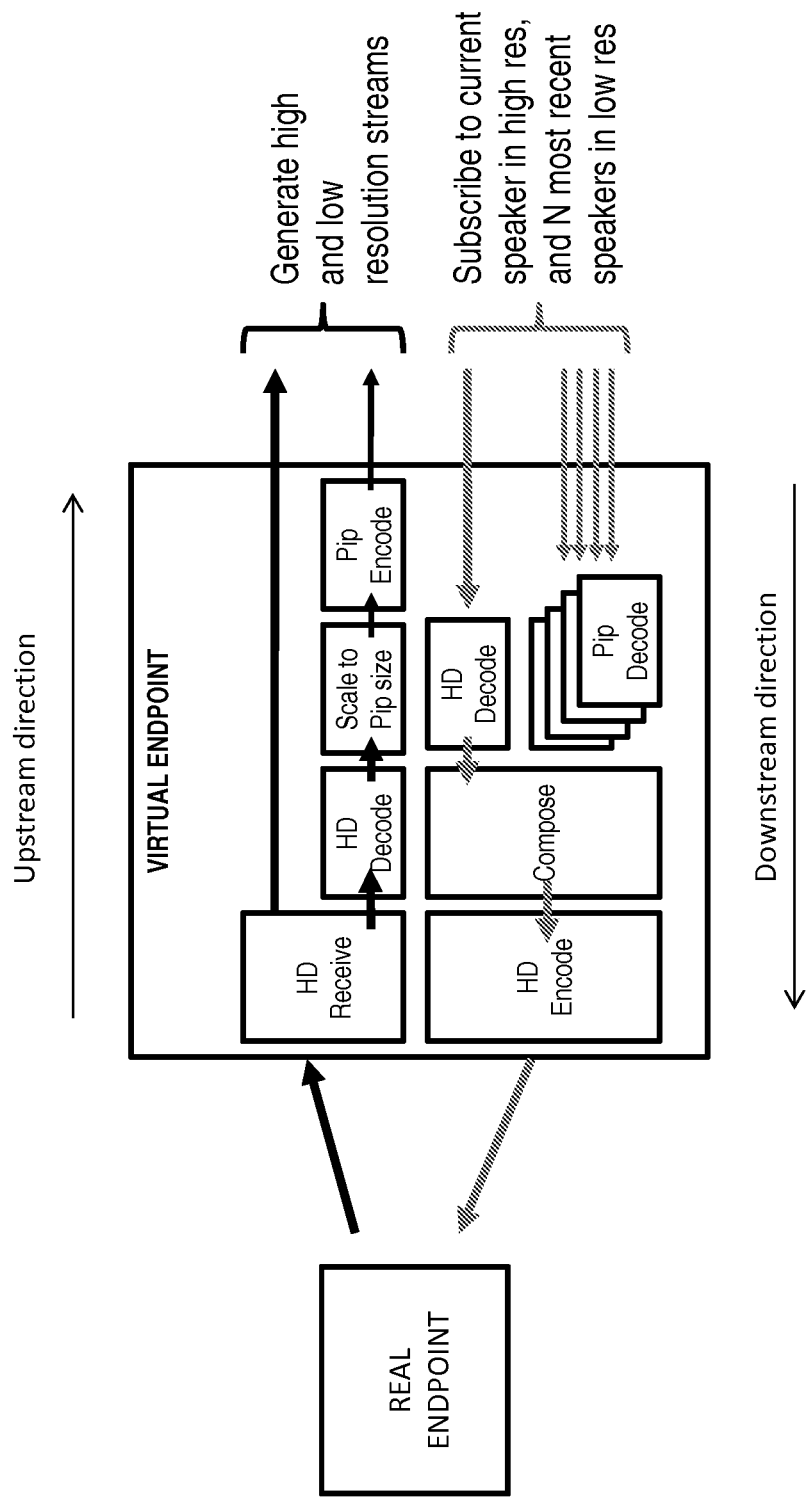
FIG. 1 is an illustration of an exemplifying virtual endpoint according to embodiments of the disclosure.

A schematic illustration of an example of a virtual endpoint as discussed above is shown in FIG. 1. Here, the task of the virtual endpoint in the upstream direction is to create and transmit two streams of the encoded data received from its associated real endpoint, one of high resolution, and one of low resolution. In the downstream direction, the task of the virtual endpoint is to decode one encoded HD (High Definition) data stream and a number of encoded PIPs (Picture In Picture) subscribed from one or more stream switching nodes, to compose a continuous presence picture from the encoded HD data stream and the number of PIPs, and then further to encode the whole continuous presence picture which is transmitted back to the associated real endpoint.

In the example above, only one downscaled stream of the encoded data received from an associated real endpoint is transmitted to the switching node. However, the scaling unit should be adjusted to downscale streams of a number of different resolutions at request. For example, a resolution according to a quadrant of picture is quite common in a continuous presence view.

Figure 2:
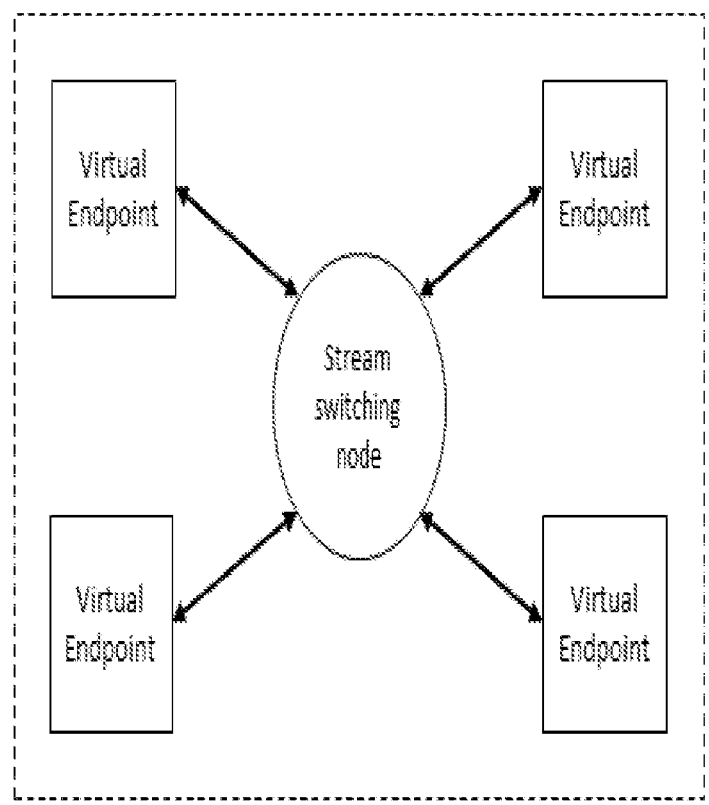
FIG. 2 is an illustration of an exemplifying Multipoint Control Unit (MCU) consisting of a number of virtual endpoints and a switching node according to embodiments of the disclosure.

A single MCU may be implemented as software on a physical off-the-shelf server/computer, consisting of a number of virtual endpoints plus a switching core, as shown in FIG. 2. Alternatively the components inside the dotted line may be deployed natively on a server. In the following, a virtualized-instance is described under the understanding that non-virtualized deployments are also possible.

Figure 3:
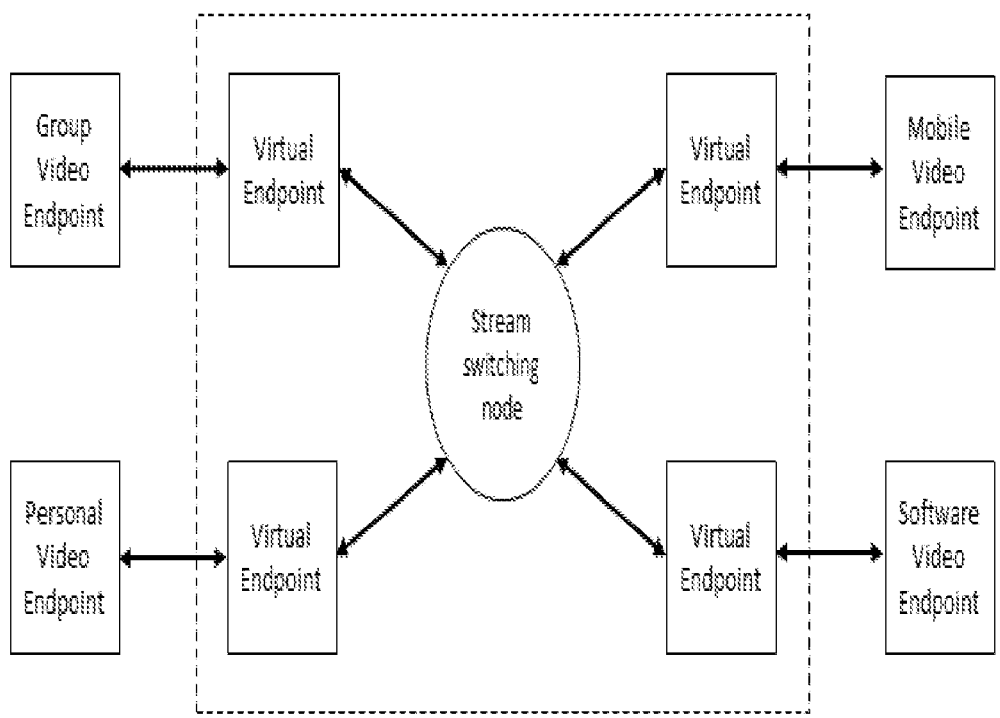
FIG. 3 is an illustration of an exemplifying MCU connected to a variety of different types of endpoints according to embodiments of the disclosure.

As indicated in FIG. 3, the virtual endpoints inside the MCU are connected to the associated real endpoints which may be a variety of different types of endpoints like group video endpoints, personal video endpoints, mobile video endpoints and software video endpoints, as shown in FIG. 3.

Figure 4:
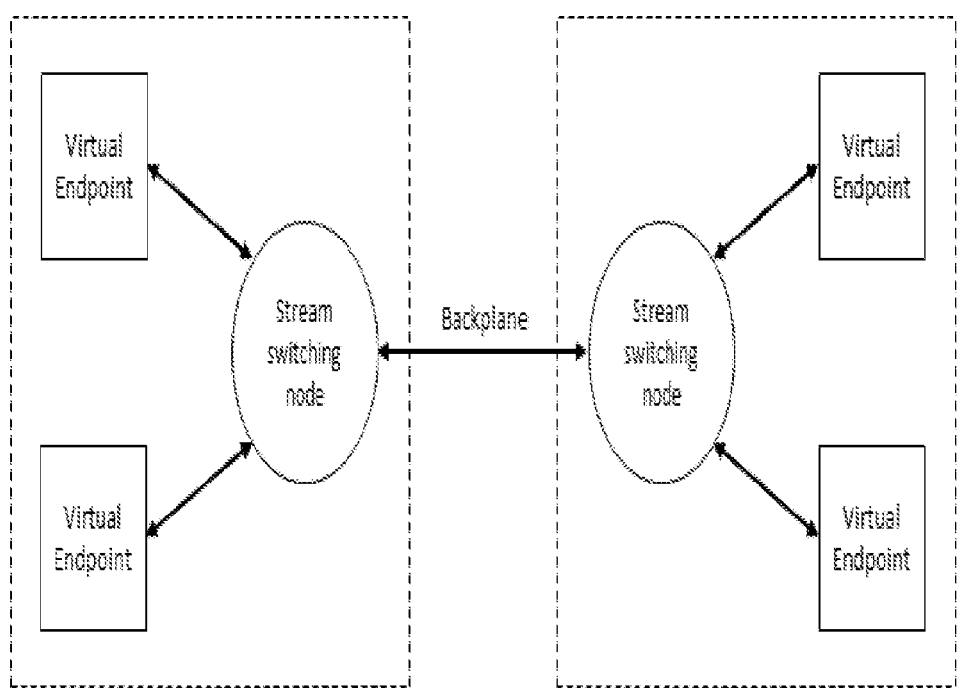
FIG. 4 illustrates an exemplifying distributed MCU comprising duplets of one switching node and two virtual endpoints according to embodiments of the disclosure.

As illustrated in FIG. 4, multiple stream switching nodes associated with a number of virtual endpoints framed by dotted lines may be connected in a distributed fashion by a backplane, which connects multiple stream switching nodes in a tree and/or mesh topology. The multiple stream switching nodes and the associated virtual endpoints can either be deployed on the same host (physical server), or on different hosts for geographical distribution.

According to embodiments herein, the virtual endpoint shields the internal logic in the MCU from the real endpoint. The real endpoint could be any standards based SIP, H.323, HTML5 endpoint, using any number of voice and video codecs.

As earlier indicated, the virtual endpoint might subscribe 15 to receive, from the switching core, a number of video streams:
  The current speaker in high resolution
  The most recent arbitrary number of speakers, for instance 4-9 speakers, as low resolution streams
  The exception to this rule is that the participant who is the current speaker is likely to want to receive the previous speaker in high resolution, since it is likely that no participant will want to view himself in full screen view.

The virtual endpoint will then decode these streams, scale and compose it into a nice continuous presence layout, and encode the resulting image into a video stream appropriate for the real endpoint it is connected to.

An optional stream switching node may make all its streams available also over the backplane. Hence, in a distributed system, another stream switching node can request to receive any number of streams. This means that the user experience for all endpoints might be identical, e.g. current speaker in full screen plus a number of recent speakers in small thumbnail views. The fact that multiple streams may be transmitted between stream switching nodes is a major difference from the way existing MCUs are cascaded using mechanisms like H.243 (these old ways of doing cascading only provide a single bidirectional video stream between the MCUs)

Figure 5:
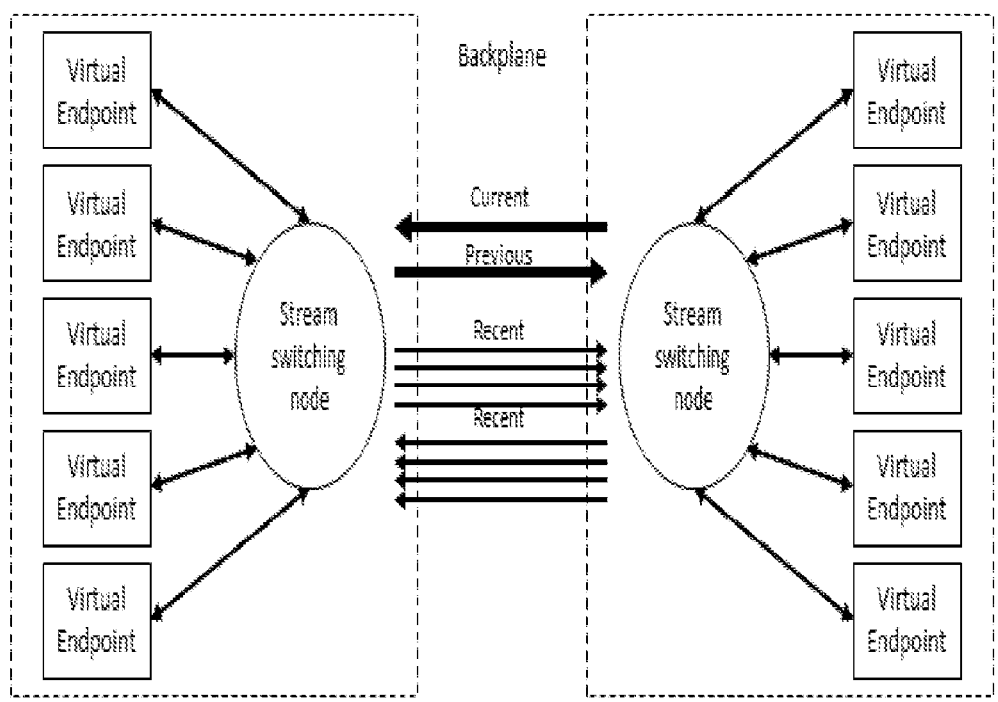
FIG. 5 illustrates in an exemplifying manner how a backplane only requires to carry one high resolution stream in addition to a number of low resolution streams according to one of the embodiments herein.

Since multiple streams are transmitted over the backplane, bandwidth usage is a concern. However, only the streams representing current and previous speakers are transmitted at full resolution. The other participants may be scaled down to between $1/25$th and $1/100$th of a full screen view. In a distributed conference, this means that that the backplane never needs to carry more than one high resolution stream plus e.g. nine low resolution streams. If the bandwidth of the low resolution stream is 1-5% of the bandwidth of the full resolution stream, it means that the total bandwidth used across the backplane between two nodes will typically be between 1 and 1.5 times the bandwidth of a single stream. An illustration of this is shown in FIG. 5.

The embodiments herein provide significant savings over traditional non-distributed MCU conferences. As an example, consider the use case of a global company all-hands meeting with e.g. 100 participants in the US and 100 participants in Europe. In a traditional MCU deployment, all 200 participants would call into a single MCU. This would require 100 full resolution streams across the Atlantic. According to some of the embodiments herein, only a single full-resolution stream would be transmitted across the Atlantic, plus up to e.g. 9 smaller "thumbnails" of recent speakers. If each thumbnail is $1/100$th of a full resolution stream, it means that rather than sending 100 streams we are sending 1.09 streams.

From an end-user point of view, the number or URI (Uniformed Resource Identifier) to dial in order to join a particular conference is the same regardless of which location the end-user is located. The endpoint will connect to its closest switching node based on either configured location or automatic location assignment based on any number of well-known methods.

Figure 6:
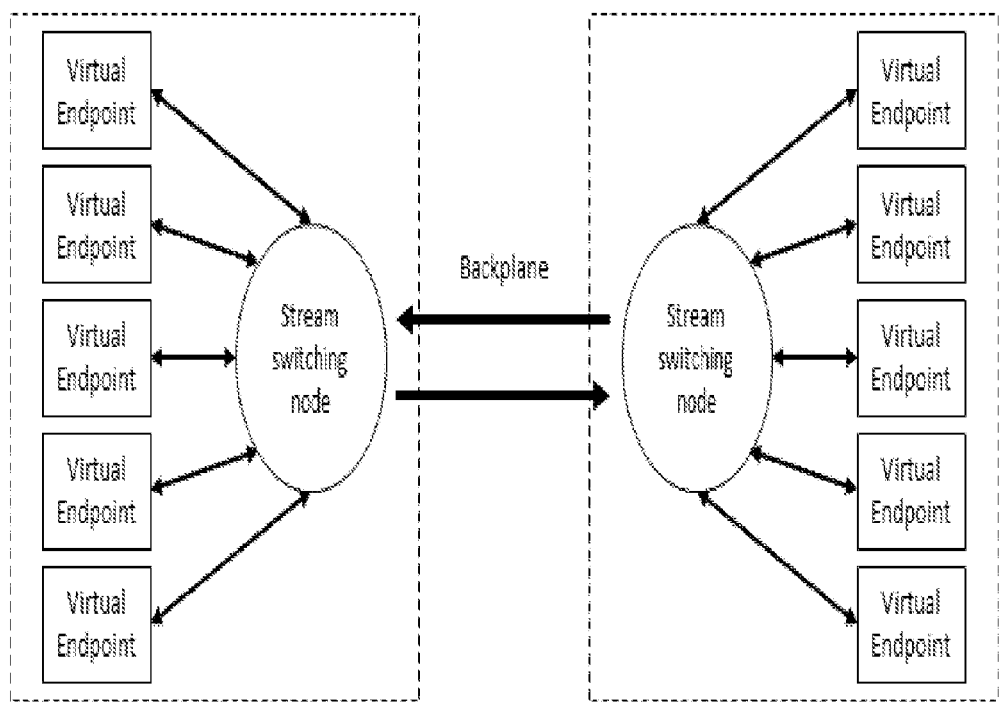
FIG. 6 shows in an exemplifying manner how media streams across a backplane simply can be copied and forwarded across the backplane in accordance with embodiments of the disclosure.

In a distributed conference, media data will pass through one or more switching nodes. In the ideal case, the network 15 connection between switching nodes is perfect, with no packet loss. In this case, the media streams across the backplane can simply be copied and forwarded across the backplane as illustrated in FIG. 6.

However, in the case of packet loss or other network 20 problems in the network, some robustness/resilience may preferably be added. According to embodiments herein, there are two methods. The first one is to re-encode the media that is transmitted over the backplane, and the second one is to protect the media stream by adding error correction to the media stream. A combination is of course also possible—re-encode the media into a more resilient format (e.g. using hierarchical encoding methods such as those that exist in H.264) and additionally add error correction.

Re-encoding the media may possibly add latency in the order of e.g. 10-100 ms to the media stream. Adding error correction may add overhead and may require increased bandwidth. In some cases, such as when multiple stream switching nodes are located in the same data-center, the network can be engineered such that packet loss is avoided. Hence the embodiments as described herein may be scaled up without adding latency.

Figure 7:
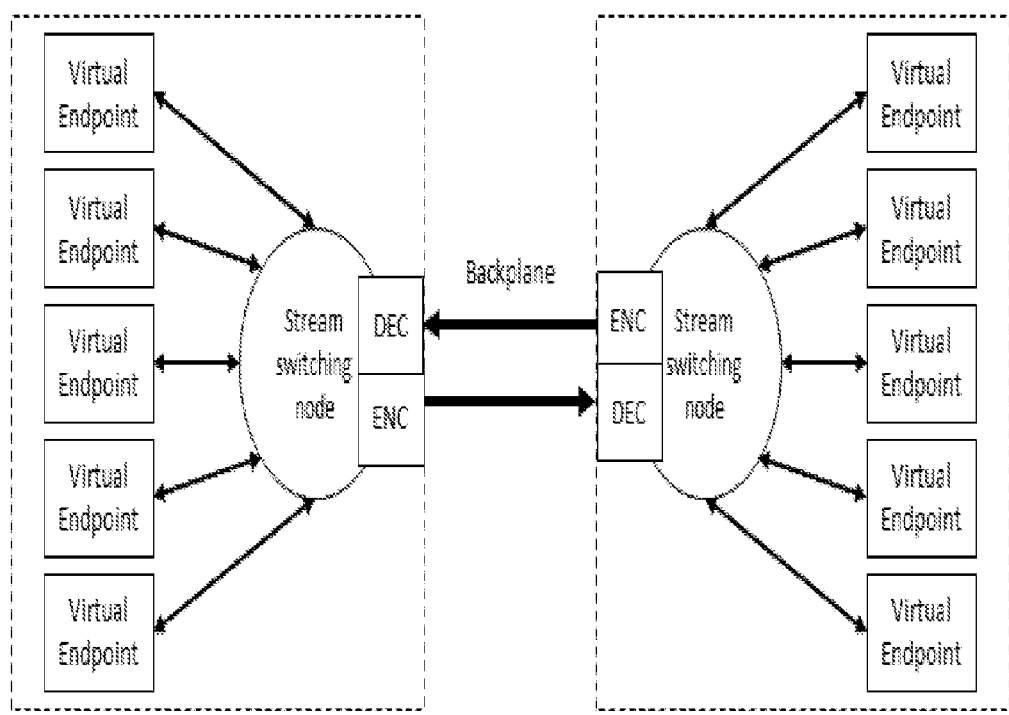
FIG. 7 illustrates in an exemplifying manner how media data across the backplane can be encoded to provide an efficient format between the switching nodes in accordance with embodiments of the disclosure.

In order to reduce bandwidth between the switching nodes, the media data across the backplane can be encoded into a more efficient format. As an example, if the endpoints participating in a conference use H.263 and/or H.264, a more bandwidth efficient codec such as ITU-T H.265/HEVC can be used across the backplane, in order to save 20-50% bandwidth. This is illustrated in FIG. 7 with a decoder (dec) and encoder (enc) on each switching towards the backplane interface.

What is claimed is:

1. A method comprising:
   at a virtual endpoint:
     creating a first upstream encoded media stream and a second upstream encoded media stream;
     decoding the first upstream encoded media stream into an upstream decoded media stream;
     scaling the upstream decoded media stream into a scaled upstream media stream such that the scaled upstream media stream has a lower resolution than the second upstream encoded media stream;
     encoding the scaled upstream media stream into an encoded scaled upstream media stream; and
     transmitting, to a stream switching node, the encoded scaled upstream media stream and the second upstream encoded media stream, so as to cause the stream switching node to transmit, over a backplane to another stream switching node associated with at least one other virtual endpoint, the encoded scaled upstream media stream and the second upstream encoded media stream.

2. The method of claim 1, wherein a resolution of the second upstream encoded media stream is a High Definition (HD) resolution.

3. The method of claim 1, wherein a resolution of the scaled upstream media stream is a Picture-in-Picture (PIP) resolution.

4. A multipoint control unit comprising:
   a stream switching node; and
   a virtual endpoint operable to communicate with the stream switching node, the virtual endpoint configured to:
     create a first upstream encoded media stream and a second upstream encoded media stream;
     decode the first upstream encoded media stream into an upstream decoded media stream;
     scale the upstream decoded media stream into a scaled upstream media stream such that the scaled upstream media stream has a lower resolution than the second upstream encoded media stream;
     encode the scaled upstream media stream into an encoded scaled upstream media stream; and
     transmit, to the stream switching node, the encoded scaled upstream media stream and the second upstream encoded media stream, so as to cause the stream switching node to transmit, over a backplane to another stream switching node associated with at least one other virtual endpoint, the encoded scaled upstream media stream and the second upstream encoded media stream.

5. The multipoint control unit of claim 4, wherein a resolution of the second upstream encoded media stream is a High Definition (HD) resolution.

6. The multipoint control unit of claim 4, wherein a resolution of the scaled upstream media stream is a Picture-in-Picture (PIP) resolution.

7. One or more non-transitory computer readable storage media encoded with executable instructions that, when executed by one or more processors, cause the one or more processors to:
   create a first upstream encoded media stream and a second upstream encoded media stream;
   decode the first upstream encoded media stream into an upstream decoded media stream;
   scale the upstream decoded media stream into a scaled upstream media stream such that the scaled upstream media stream has a lower resolution than the second upstream encoded media stream;
   encode the scaled upstream media stream into an encoded scaled upstream media stream; and
   transmit, to a stream switching node, the encoded scaled upstream media stream and the second upstream encoded media stream, so as to cause the stream switching node to transmit, over a backplane to another stream switching node associated with at least one virtual endpoint, the encoded scaled upstream media stream and the second upstream encoded media stream.

8. The non-transitory computer readable storage media of claim 7, wherein a resolution of the second upstream encoded media stream is a High Definition (HD) resolution.

9. The non-transitory computer readable storage media of claim 7, wherein a resolution of the scaled upstream media stream is a Picture-in-Picture (PIP) resolution.

10. The method of claim 1, further comprising:
    receiving encoded data from a video conference endpoint, wherein
    creating the first upstream encoded media stream and the second upstream encoded media stream includes creating the first upstream encoded media stream and the second upstream encoded media stream based on the encoded data.

11. The method of claim 1, wherein scaling the upstream decoded media stream includes scaling the upstream decoded media stream to a predefined or requested resolution.

12. The method of claim 1, further comprising:
    receiving, from the stream switching node, a downstream encoded media stream and an encoded scaled downstream media stream;
    decoding the downstream encoded media stream into a downstream decoded media stream;
    decoding the encoded scaled downstream media stream into a decoded scaled downstream media stream;
    composing the downstream decoded media stream and the decoded scaled downstream media stream into a composed downstream media stream;
    encoding the composed downstream media stream into an encoded composed downstream media stream; and
    transmitting the encoded composed downstream media stream to a video conference endpoint.

13. The method of claim 12, wherein:
    receiving the encoded scaled downstream media stream includes receiving a plurality of encoded scaled downstream media streams;
    decoding the encoded scaled downstream media stream into a decoded scaled downstream media stream includes decoding the plurality of encoded scaled downstream media streams into a plurality of decoded scaled downstream media streams; and composing the downstream decoded media stream and the decoded scaled downstream media stream into the composed downstream media stream includes composing the downstream decoded media stream and the plurality of decoded scaled downstream media streams into the composed downstream media stream.

14. The method of claim 12, wherein a resolution of the downstream encoded media stream is a High Definition (HD) resolution, and a resolution of the encoded scaled downstream media stream is a Picture-in-Picture (PIP) resolution.

15. The multipoint control unit of claim 4, wherein the virtual endpoint is further configured to:

receive encoded data from a video conference endpoint; and create the first upstream encoded media stream and the second upstream encoded media stream by creating the first upstream encoded media stream and the second upstream encoded media stream based on the encoded data.

16. The multipoint control unit of claim 4, wherein the virtual endpoint is configured to scale the upstream decoded media stream by scaling the upstream decoded media stream to a predefined or requested resolution.

17. The multipoint control unit of claim 4, wherein the virtual endpoint is further configured to:

receive, from the stream switching node, a downstream encoded media stream and an encoded scaled downstream media stream;

decode the downstream encoded media stream into a downstream decoded media stream;

decode the encoded scaled downstream media stream into a decoded scaled downstream media stream;

compose the downstream decoded media stream and the decoded scaled downstream media stream into a composed downstream media stream;

encode the composed downstream media stream into an encoded composed downstream media stream; and transmit the encoded composed downstream media stream to a video conference endpoint.

18. The multipoint control unit of claim 17, wherein the virtual endpoint is configured to:

receive the encoded scaled downstream media stream by receiving a plurality of encoded scaled downstream media streams;

decode the encoded scaled downstream media stream into a decoded scaled downstream media stream by decoding the plurality of encoded scaled downstream media streams into a plurality of decoded scaled downstream media streams; and compose the downstream decoded media stream and the decoded scaled downstream media stream into the composed downstream media stream by composing the downstream decoded media stream and the plurality of decoded scaled downstream media streams into the composed downstream media stream.

19. The non-transitory computer readable storage media of claim 7, wherein the instructions further cause the one or more processors to:

receive encoded data from a video conference endpoint; and create the first upstream encoded media stream and the second upstream encoded media stream based on the encoded data.

20. The non-transitory computer readable storage media of claim 7, wherein the instructions that cause the one or more processors to scale the upstream decoded media stream include instructions that cause the one or more processors to scale the upstream decoded media stream to a predefined or requested resolution.

21. The non-transitory computer readable storage media of claim 7, wherein the instructions further cause the one or more processors to:

receive, from the stream switching node, a downstream encoded media stream and an encoded scaled downstream media stream;

decode the downstream encoded media stream into a downstream decoded media stream;

decode the encoded scaled downstream media stream into a decoded scaled downstream media stream;

compose the downstream decoded media stream and the decoded scaled downstream media stream into a composed downstream media stream;

encode the composed downstream media stream into an encoded composed downstream media stream; and transmit the encoded composed downstream media stream to a video conference endpoint.

22. The non-transitory computer readable storage media of claim of claim 21, wherein the instructions cause the one or more processors to:

receive a plurality of encoded scaled downstream media streams;

decode the plurality of encoded scaled downstream media streams into a plurality of decoded scaled downstream media streams; and compose the downstream decoded media stream and the plurality of decoded scaled downstream media streams into the composed downstream media stream.

* * * * *